Oct. 20, 1953 C. W. McKEE ET AL 2,656,503
RAIL CAR FISSURE DETECTING APPARATUS
Filed Jan. 24, 1949
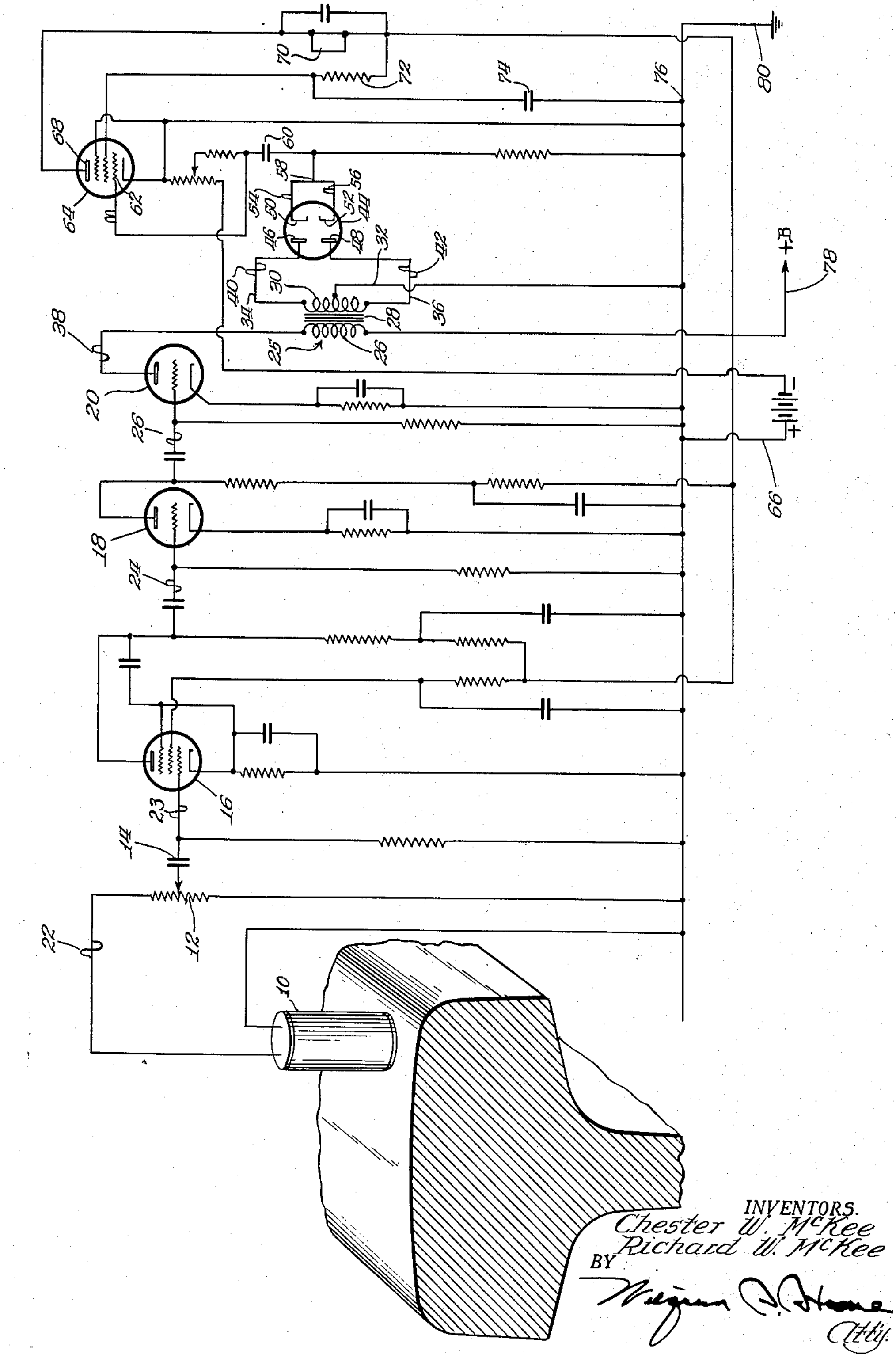
INVENTORS.
Chester W. McKee
Richard W. McKee
BY
Atty.

Patented Oct. 20, 1953

2,656,503

UNITED STATES PATENT OFFICE 2,656,503

RAIL CAR FISSURE DETECTING APPARATUS

Chester W. McKee and Richard W. McKee, Chicago, Ill., assignors to Teledetector, Inc., Chicago, Ill., a corporation of Delaware Application January 24, 1949, Serial No. 72,384

4 Claims. (Cl. 324—37)

This invention relates to a method of detecting fissures in rail ball lying in track and to a rail car fissure detecting apparatus for performing the method. More particularly, this invention relates to discriminating between potential signals lying in the same amplitude range but derived from both fissure significant and non-significant rail ball flux fields, by means of frequency. The invention stemmed from applicants' desire to eliminate the twin triode, phase inverter stage of the amplifier shown in United States Letters Patent No. 2,388,683.

Full wave rectification is described in United States Letters Patent No. 2,388,683, where in Figure 47 there is shown a wiring diagram of applicants' phase inverter stage. As explained in this patent, applicants' pickup coil, having a length longitudinally of the rail less than the length of an internal fissure flux field, produces a potential signal having one positive and one negative component (possibly two positives and two negatives) as a result of completely traversing a fissure flux field. For a reason not understood by applicants, these components are rarely of equal strength. The polarity of the initial component of a potential signal may be established by the direction of the windings of the pickup coil, the polarity of the trailing pole of the principal magnet being known, that is, assuming that the polarity of all fissure flux fields are the same. This assumption may be incorrect for in testing with the cathode ray tube described in the patent, sometimes the leading component of the potential signal was the strongest and sometimes the trailing component was the strongest. Sometimes one component was so weak as to produce no appreciable signal.

Applicants compensated for this frequent difference in the strength of the two components of a potential signal by full wave rectifying the potential signal so that both components functioned the pen unit. Although the pen unit receives two impulses, they are so close together in time and the tape beneath the pen moves so slowly, that the pen writes only a single mark, sometimes with a double peak.

For full wave rectification, applicants employed a phase inverter stage comprising a twin triode tube whose plates were connected respectively to the plates of a twin diode tube. This phase inverter stage gave a gain of 30 to 1 in an amplifier which could amplify almost 1,000,000 to 1. The amplifier in general and the phase inverter stage in particular were troublesome because tube elements in the amplification system produced potential signals in the output that did not reflect any change in the flux above a rail. This phase inverter stage had been adopted because electronics engineers had always considered it of value in handling a wide range of frequencies, this particular phase inverter stage being capable of handling from twenty to twenty thousand cycles.

Applicants had always assumed that potential signals derived from flux fields about a rail had a very wide range, and this invention turns on applicants' experiments with their one-half inch spool pickup coil on various types of flux fields above a rail for the purpose of determining the frequency range which their amplifier must be capable of handling.

These experiments confirmed the experiments made by Frickey and Chester W. McKee back in 1939 and 1940 before the filing of the application which became patent No. 2,388,683, although their significance was not appreciated at that time. Applicant Chester W. McKee and Frickey were reproducing potential signals derived from flux fields adjacent a rail ball on the screen of a cathode ray tube. The path of the beam for each rail traversed was some 48 inches long, 12 times the length of the path delineated by a pen unit, and the tube beam was a very sensitive instrument as compared with a pen. Applicants reached the rather general conclusion that the frequency of an internal fissure was many times greater than the frequency of a burn or magnetic spot, and apparently did not realize that the frequency of a small internal fissure, generated by a comparatively weak flux field above the rail, was not a great deal different than the frequency of the very strong rail joint signal. It was just assumed that an amplifier capable of handling a wide range of frequencies was needed. Consequently, they adopted the twin triode and twin diode phase inverter stage having a potentiometer for maintaining the gain of the two triode circuits constant. It was a very delicate stage, and an operator, not knowing the limits of the tube, could overload it so that the stage itself produced non-significant signals in the visual presentation means.

It occurred to the present applicants that they might eliminate much amplifier trouble by designing an amplifier which functioned best in handling those frequencies generated by dangerous fissures. In order to obtain the maximum efficiency for a tube, the relationship of the grid voltage to the plate current must remain constant, but this optimum relationship requires different voltages and current for tube elements for different frequencies. Applicants set out to learn the frequencies derived by their fissure detection apparatus. They mounted one of their small spool coils on the analyzer of Patent No. 2,388,683 (Fig. 29), and moved the analyzer through flux fields created by various size internal fissures in the rail, including a joint. The signals were reproduced on a cathode ray tube and they confirmed what Figs. 10 through 22 of the patent already indicated, namely, that the duration of a signal from a broken rail or rail joint was not very much greater than the duration of a signal from a five per cent fissure. The applicants were using a coil having a nonmagnetic core on a vertical axis with the outside length of the coil longitudinal of the rail approximating five-eighths of an inch. They adjusted the sweep of the tube beam on the screen so that it moved back and forth with the analyzer carriage and they measured the length of the signals produced by the various sized fissures and breaks in the rail, and found that they were all about five-eighths of an inch long, that is, the longitudinal length of the coil. They concluded that the measurable length of these strong fields in the rail were less than five-eighths of an inch and that the coil, consisting of several thousand turns of very fine wire, determined the length of the signal, that is the frequency. It is perhaps not practical to try to account for this. Frequency is an alternating current passing through zero potential twice. Considering just the leading half of applicants' coil mounted on a vertical axis, as it moves into a fissure flux field, the density and direction of the flux per unit of length traversed by the coil changes abruptly as compared with the direction and density of flux along normal rail. This produces a potential in the coil. As the coil passes into the center of the field, it ceases to cut increasing numbers of lines of flux and the potential induced in the coil drops back to zero. As this leading half of the coil enters the trailing portion of the fissure flux field, a potential signal of opposite polarity is induced into the coil. Assuming that a fissure flux field is only about one inch long, if the trailing half of the coil is spaced from the leading half of the coil by more than an inch, the coil in passing through the fissure flux field will produce two complete cycles, that is, the potential on the coil will pass through zero four times. As the trailing windings of the coil are brought closer to the leading windings, the trailing windings have a certain canceling effect on the potential produced by the leading windings when passing through these short fissure flux fields. Applicants' studies indicate that when their short coil in which the leading windings are spaced from the trailing windings by only one-eighth of an inch, this being the diameter of the nonmagnetic core, the coil in passing through a fissure flux field does produce two complete cycles. However, the leading half cycle is frequently very weak as is the trailing half cycle and is undetectable excepting when the pickup circuit and amplifier is connected to a sensitive oscillocope. It is, of course, apparent that the length of the pickup coil longitudinally of the rail is in part responsible for the frequency derived from a fissure flux field. Where the leading and trailing windings of a vertically disposed coil are very close together, and when the over-all longitudinal dimension of the coil is about the same as the over-all longitudinal dimension of the fissure flux field, the length of the coil approximately determines the distance that the coil must traverse to produce one alternating current frequency, that is, to move the potential of the induced current through zero twice. In fact, applicants believe that the correct theory is that such a coil produces two complete cycles, but that it is the trailing half of the first cycle and the leading half of the second cycle which are the strongest, strong enough to affect the pen unit, and this can be considered as one full cycle. At any event, the applicants concluded that for all practical purposes, utilizing their small coil, five-eighths of an inch represented the distance that must be traversed by the pickup coil to produce a potential signal having a positive and a negative component from a fissure or a break in the rail.

Determining the frequency of the transient fissure flux field potential signal for any given speed of the car was then quite easy. Assuming that the car was moving at eight miles an hour, the car would cover 42,240 feet in an hour or 11.7 feet per second, or 140 inches per second. Dividing five-eighths of an inch into 140 inches, one obtains a frequency of approximately 224 per second. Applicants now use a coil having an over-all length along the rail of approximately seven-sixteenths of an inch, which divided into 140 inches, gives a frequency of approximately 320 cycles per second. This immediately showed that it was unnecessary to utilize a wide range phase inverter stage.

Applicants then designed the amplifier shown in the single figure in the accompanying drawings.

Continuing to refer to that figure, the numeral 10 identifies in full scale one of applicants' pickup coils positioned above a rail ball also in full scale. The pickup is suspended from a car which carries means for energizing a rail ball so as to create flux fields thereabout. The coil is wound on a vertical nonmagnetic core and has a length longitudinally of the rail of approximately seven-sixteenths of an inch. In the circuit of the pickup coil is the resistance of a potentiometer 12. The sliding contact of the potentiometer 12 is carried through the condenser 14, to a voltage amplification stage 16, and then through second and third amplification stages 18 and 20. The sine wave signals 22, 23, 24 and 26 illustrate how the phase of the signal is inverted as it passes through each stage.

The output of the stage 20 is led to a push-pull, interstage transformer 25 having a primary 26, core 28, secondary 30, and a push-pull connection to ground 32. As is well understood, both the conductor 34 and the conductor 36 will receive a true reflection of a potential signal 38, but the phase of the potential signal 40 will be opposite to the phase of the potential signal 42, although in exact timed relationship. The twin diode tube 44 receives both signals 40 and 42 on its plates 46 and 48. This tube being conductive in only one direction will permit only the positive half of each signal to affect the circuit on the cathodes 50 and 52 with the result that two positive signals 54 and 56 immediately succeeding each other will be combined on the conductor 58 and successively charge the condenser 60.

The amplified potential signal from the condenser 60 is carried to the grid 62 of a pentode tube 64 deriving its bias from a battery 66. The plate 68 of the pentode 64 is connected to one post of a pen unit relay 70, the other post being connected through a resistance 72 and a condenser 74 to ground at 76. The numeral 78 identifies the power supply for the amplifier and 80, identifies the ground.

The amplifier should operate at peak efficiency when handling potential signals having a frequency of about 350 to 400 cycles. This is accomplished by selecting those resistors and condensers which maintain a tube operating in the flat portion of the EGIP (relation between grid voltage and plate current) curve. The amplifier has a fixed gain, there being no potentiometer in the circuit of any tube element. The same is true of the push-pull, interstage transformer 25. The subject matter of this paragraph is accomplished in ways well known to electronics engineers.

The use of the push-pull, interstage transformer has a great advantage over the twin triode phase inverter stage of earlier amplifiers when the amplifier is connected to a pen unit. Where the objective is to depict faithfully detail variations in transient signals on the screen of a cathode ray tube, the phase inverter stage is valuable, but where all that is wanted is to snap the relay of a pen unit, a twin triode phase inverter stage is not needed, and should not be used if it has disadvantages which another usable full wave rectifier lacks. In the twin triode phase inverter, the potential signal from the preceding stage is conducted to one grid which functions in connection with two plates and two cathodes in the same glass envelope where two triode tubes are used in place of the twin triode, the potential signal is conducted to two grids. In order to maintain the comparative strength of the positive and negative components of a fissure potential signal, each set of elements must be identical when the tube, or tubes, are installed, and they must wear out at approximately the same rate. Neither of these conditions is likely to exist. No twin triode tubes when new are exactly alike, nor are the two sets of elements in a twin triode tube. Applicants employed a potentiometer to adjust the strength of the signal developed on one plate to the strength of the signal developed on the other plate. All of which is confusing to a detector car operator and it too frequently leaves the amplifier out of proper adjustment during testing.

The push-pull, interstage transformer 25 is not subject to these difficulties because the windings on its secondary are uniform and it is possible to tap the secondary to ground at its exact center. The frequency of 400 cycles is in the lower audio range and the transformer can handle a range of 40 to 12,000 cycles without adjustment. Bearing in mind that applicants have found that the frequency of their potential signals is largely controlled by the length of their coil along the rail and by the speed of the car, it will be appreciated that applicants' use of a single small coil provides a system of producing fissure potential signals of fairly uniform frequency which, when amplified and rectified by a constant gain amplifier and limited range rectifier, eliminates the possibility of improper adjustment by an operator.

The great advantage in fissure detecting in providing an amplifier specifically designed to handle fissure flux field frequencies is demonstrated by the following facts. The flux fields above a rail are never uniform. The fields above a ball are continuously inducing potential signals to the very sensitive nonmagnetic coil of the type applicants' use. These fields which are non-significant are produced by all sorts of small irregularities in the surface of the rail ball. In the accompanying chart,

| Length of flux field longitudinally of rail ball | Speed of car ($x$ frequency at one mile per hour for ½" field) | | |
|---|---|---|---|
| | 2 miles | 4 miles | 8 miles |
| ¼" | $2x$ | $4x$ | $8x$ |
| ½" | $x$ | $2x$ | $4x$ |

in the first column, there is shown in the first line the length of a flux field caused by a non-significant surface detect in the rail and it is listed at one-fourth of an inch. Most of these flux fields are much shorter. In the next three columns, "$x$" stands for the frequency at one mile per hour for a one-half inch field measured longitudinally of the rail and the numeral stands for the speed in miles of the car along the track. The three columns, therefore, show the frequencies produced by a flux field having a length above the rail of one-fourth of an inch when the car is operating at speeds of 2, 4 and 8 miles per hour. In the second line, the first column shows the length of a typical fissure flux field. This field being twice the length of the non-significant flux field shown in the first line, will produce a frequency which is one-half the frequency shown in the first line and this is indicated by the numeral "$x$" in the second column. The frequencies produced by this field for 2, 4 and 8 miles an hour are, therefore, represented by "$x$," "$2x$" and "$4x$." Applicants designed their amplifier to handle frequencies in a range slightly above and slightly below "$4x$." This may be illustrated by a curve for the amplifier wherein the

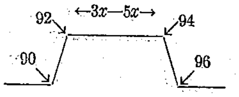

line from 90 to 92 indicates the amplifier's gain factor as frequency increases from zero to "$3x$" which is not fully amplified by the amplifier, and the line from 94 to 96 indicates the amplifier's gain factor as frequency increases above "$5x$" which is not fully amplified by the amplifier. The line from 92 to 94 indicates that the amplifier's gain factor is fully utilized and substantially constant in handling frequencies of "$3x$" to "$5x$." With the car moving along the track at a speed of eight miles an hour, fissure flux fields having a length along the rail of one-half an inch will produce potential signals having a frequency of approximately "$4x$," or better "$3x$" to "$5x$." These signals are amplified satisfactorily by the amplifier and reproduced by the pen unit. Potential signals from the one-fourth inch field, however, have a frequency of "$8x$" and this frequency exceeds the optimum operating point of the amplifier, with the result that these signals are less likely to actuate the pen unit. If the speed of the car is reduced to four miles an hour, the signals derived from fissure flux fields have a frequency of "$2x$" which is outside the optimum range of the amplifier and should not reproduce well on the pen unit. Moreover, the signals from the non-significant surface defects having a length of one-fourth of an inch, are now in a frequency of "$4x$," squarely in the center of the optimum operational range of the amplifier, and they are more likely to produce potential signals which will cause the pen unit to write.

This is the fact. Applicants have run a test track containing fissures of known sizes and known locations at eight miles an hour with this equipment and their pen unit has written satisfactory potential signals produced by the fissure flux fields, only rarely writing signals from the short, non-significant flux fields above a rail. When the car was re-run over the same test track at only four miles an hour, the amplitude of the fissure flux field signals was less and the pen wrote many signals derived from short, non-significant flux fields above the rail.

This method of amplifying only those signals having a frequency typical of the frequency of dangerous internal fissures constitutes a method of eliminating many high frequency signals derived from non-significant short flux fields above the rail, such as those caused by burns, and of eliminating many low frequency signals derived from non-significant long flux fields such as magnetic spots in the rail and rail braces and joint bars. The method is to be contrasted with eliminating potential signals from harmless flux fields by amplitude control. Most potential signals from non-significant flux fields above a rail ball are of low amplitude as compared with the amplitude of a signal from a small fissure flux field and these low amplitude potential signals are suppressed by the potentiometer 12. However, there are many non-significant flux fields above rail balls that do generate potential signals having an amplitude as great as those derived from fissure flux fields, and until applicants discovered that they could discriminate between these signals of like amplitude by means of differences in their frequency, applicants received the non-significant, high amplitude signals on their tape. These non-significant high amplitude signals, however, are distinguishable from the high amplitude fissure signals by their frequency, and the present method and apparatus makes it possible to eliminate most of them so that the tape observer is not troubled with them.

Having thus described their invention, what applicants claim is:

1. A rail fissure detector car supported on track wheels comprising means for energizing a rail, means for moving the car along the rail at a selected speed, a pickup coil wound on a vertical axis and having a length as measured along the rail of less than the length of an internal fissure flux field, a constant gain amplifier having its input connected solely to this pickup coil and having its stages set at the optimum point for handling the frequencies produced by the pickup coil in traversing fissure flux fields at the selected speed, and a visual signal presentation means connected to the output of the amplifier.

2. A rail fissure detector car supported on track wheels comprising means for energizing a rail, means for moving the car along the rail at a selected speed, a pickup coil wound on a vertically disposed, nonmagnetic core and having a length as measured along the rail of less than the length of an internal fissure flux field, a constant gain amplifier having its input connected solely to this pickup coil and having its stages set at the optimum point for handling the frequencies produced by the pickup coil in traversing fissure flux fields at the selected speed, and a visual signal presentation means connected to the output of the amplifier.

3. A rail fissure detector car supported on track wheels comprising means for energizing a rail, means for moving the car along the rail at a selected speed, a pickup coil wound on a vertical axis and having a length as measured along the rail of less than the length of an internal fissure flux field, a constant gain amplifier having its input connected solely to this pickup coil and having its stages set at the optimum point for handling the frequencies produced by the pickup coil in traversing fissure flux fields at the selected speed, a full wave rectifier stage in the amplifier circuit, and a visual signal presentation means connected to the output of the amplifier.

4. A rail fissure detector car supported on track wheels comprising means for energizing a rail, means for moving the car along the rail at a selected speed, a pickup coil wound on a vertical axis and having a length as measured along the rail of less than the length of an internal fissure flux field, a constant gain amplifier having its input connected solely to this pickup coil and having its stages set at the optimum point for handling the frequencies produced by the pickup coil in traversing fissure flux fields at the selected speed, a push-pull, interstage transformer positioned in the amplifier circuit, a twin diode tube having its cathodes respectively connected to the two leads of the secondary of the transformer, and a visual signal presentation means connected to the output of the amplifier.

CHESTER W. McKEE.
RICHARD W. McKEE.

References Cited in the file of this patent

UNITED STATES PATENTS

| Number | Name | Date |
|---|---|---|
| 1,955,953 | Drake | Apr. 24, 1934 |
| 1,967,812 | Drake | July 24, 1934 |
| 2,089,967 | Keevil | Aug. 17, 1937 |
| 2,203,256 | Drake | June 4, 1940 |
| 2,244,606 | Bigelow | June 3, 1941 |
| 2,356,967 | Barnes et al. | Aug. 29, 1944 |
| 2,356,968 | Barnes et al. | Aug. 29, 1944 |
| 2,388,683 | Frickey et al. | Nov. 13, 1945 |
| 2,461,252 | Barnes et al. | Feb. 8, 1949 |